(12) United States Patent
Maurin

(10) Patent No.: US 7,900,553 B1
(45) Date of Patent: Mar. 8, 2011

(54) APPARATUS FOR COOKING USING WOOD PELLETS

(76) Inventor: Edward C. Maurin, Kansas City, MO (US)

(*) Notice: Subject to any disclaimer, the term of this patent is extended or adjusted under 35 U.S.C. 154(b) by 719 days.

(21) Appl. No.: 11/940,890

(22) Filed: Nov. 15, 2007

(51) Int. Cl.
*A47J 37/00* (2006.01)
*F24B 3/00* (2006.01)

(52) U.S. Cl. ............. 99/339; 99/473; 99/482; 126/25 R; 126/10; 126/41 R

(58) Field of Classification Search ............ 99/482, 99/481, 339, 340, 467, 473, 474; 126/25 R, 126/41 R, 39 D, 7, 10, 11
See application file for complete search history.

(56) References Cited

U.S. PATENT DOCUMENTS

| | | | |
|---|---|---|---|
| 3,683,791 A | 8/1972 | Rast | |
| 3,882,767 A * | 5/1975 | Oyler et al. | ............ 99/339 |
| 4,773,319 A | 9/1988 | Holland | |
| 4,823,684 A | 4/1989 | Traeger et al. | |
| 5,123,360 A | 6/1992 | Burke et al. | |
| 5,144,939 A | 9/1992 | Christopherson | |
| 5,251,607 A | 10/1993 | Traeger et al. | |
| 5,429,110 A | 7/1995 | Burke et al. | |
| 5,528,984 A * | 6/1996 | Saurwein | ............ 99/482 |
| 6,038,964 A * | 3/2000 | Sikes | ............ 99/340 |
| 6,223,737 B1 | 5/2001 | Buckner | |
| 6,314,868 B1 | 11/2001 | Christensen et al. | |
| 6,539,843 B2 | 4/2003 | Andress | |
| 6,748,940 B2 | 6/2004 | Bennett et al. | |
| 6,945,160 B2 | 9/2005 | Christensen et al. | |
| 7,159,509 B2 * | 1/2007 | Starkey | ............ 99/339 |
| 2003/0217647 A1 * | 11/2003 | Jones | ............ 99/450 |
| 2004/0226550 A1 | 11/2004 | Hutton et al. | |

* cited by examiner

*Primary Examiner* — Reginald L Alexander
(74) *Attorney, Agent, or Firm* — Fellers, Snider, Blankenship, Bailey & Tippens, P.C.; Dennis D. Brown

(57) ABSTRACT

An apparatus for cooking using wood pellets comprising: a direct cooking zone; an indirect cooking zone separated from the direct cooking zone by a divider; and a wood pellet burner positioned in the direct cooking zone such that food items in the direct cooking zone will be positioned above the burner. The cooking apparatus has a combustion flow path such that combustion gas from the burner will flow upwardly in the direct cooking zone, then over the divider, and then downwardly into the indirect cooking zone. The downward flow of combustion gas into the indirect cooking zone provides a top down cooking mode for food products placed therein.

16 Claims, 4 Drawing Sheets

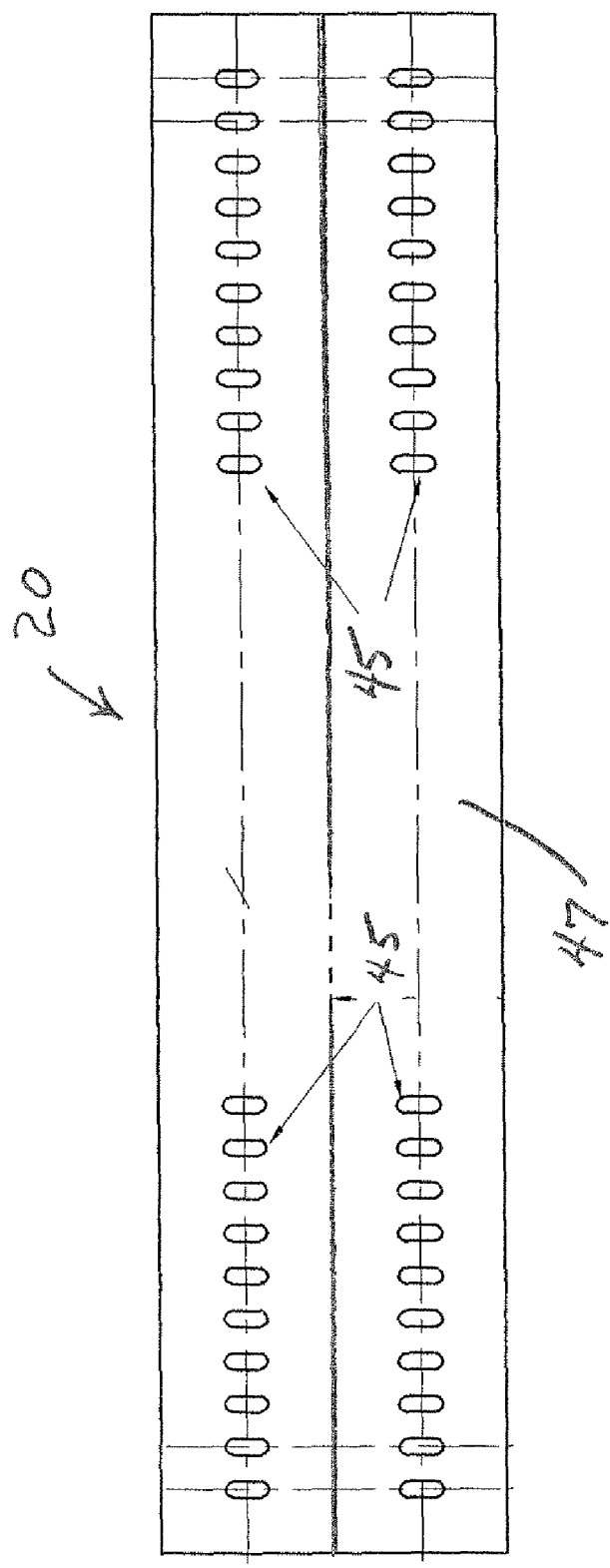

APPARATUS FOR COOKING USING WOOD PELLETS

FIELD OF THE INVENTION

The present invention relates to cooking apparatuses and systems which are fueled using wood pellets.

BACKGROUND OF THE INVENTION

A need exists for a more efficient and flexible apparatus and system for cooking food products using a wood pellet fuel. The improved system will preferably provide better temperature and cooking control and also produce a more flavorful, consistent, tender, and moist product. A need particularly exists for a wood pellet cooking apparatus and system of this type which can be readily sized, and is well suited, for home use.

SUMMARY OF THE INVENTION

The present invention provides a wood pellet burning apparatus and system which is effective for cooking and/or smoking all types of meat, poultry, fish, vegetable, and other food products. In addition to providing a direct cooking zone, the inventive apparatus and system includes a highly efficient and highly controllable indirect cooking zone which provides top down cooking. The top down cooking mode provided in the indirect cooking zone allows the user to directly view the degree of doneness, brownness, and crispness of the product without having to turn the product over. In addition, the top down cooking mode provided in the indirect cooking zone allows fat from the product to drip onto a non-heated drain pan so that the possibility of flaming and flare ups in the indirect cooking zone is substantially eliminated.

In one aspect, there is provided an apparatus for cooking using wood pellets comprising: a direct cooking zone for cooking food items placed therein; an indirect cooking zone for cooking food items placed therein; a divider which separates the direct cooking zone from the indirect cooking zone; and a burner for burning wood pellets to produce a combustion gas. The burner is positioned in the direct cooking zone such that the food items placed in the direct cooking zone will be positioned above the burner. The apparatus has a combustion gas flow path wherein the combustion gas from the burner will flow upwardly in the direct cooking zone, then over an upper end of the divider, then downwardly onto the food items placed in the indirect cooking zone.

In another aspect, there is provided an apparatus for cooking using wood pellets comprising: a housing; a direct cooking zone in the housing for cooking food items on a first food holding structure; an indirect cooking zone in the housing for cooking food items on a second food holding structure; a divider in the housing which separates the direct cooking zone from the indirect cooking zone; a burner for burning wood pellets to produce a combustion gas; and a hood positionable on the housing for closing the housing. The burner is positioned in the direct cooking zone such that the food items on the first holding structure will be positioned above the burner. The housing includes a combustion gas outlet for the indirect cooking zone, the combustion gas outlet being located such that the food items on the second food holding structure will be positioned at a level above the combustion gas outlet. When the hood is positioned to close the housing, the combustion gas from the burner will flow upwardly in the direct cooking zone, then over an upper end of the divider, then downwardly through the second food holding structure, and then out of the combustion gas outlet.

Further aspect, features, and advantages of the present invention will be apparent to those of ordinary skill in the art upon examining the accompanying drawings and upon reading the following detailed disclosure of the preferred embodiments.

BRIEF DESCRIPTION OF THE DRAWINGS

FIG. 4 is a plan view of a heat distributor 20 employed in the inventive apparatus 2.

DETAILED DESCRIPTION OF THE PREFERRED EMBODIMENTS

Figure 1:
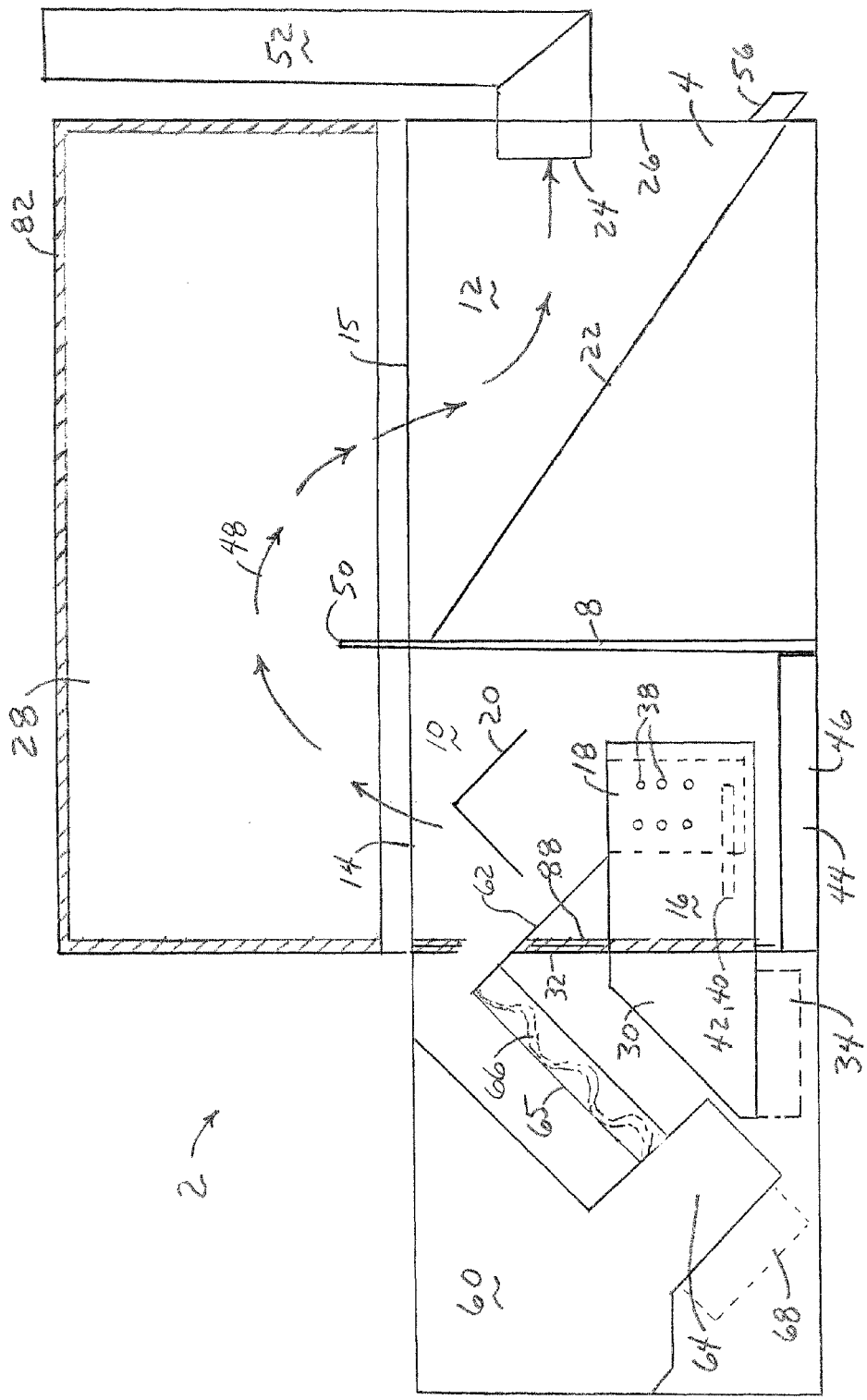
FIG. 1 is a schematic cutaway elevational side view of an embodiment 2 of the inventive cooking apparatus.
Figure 2:
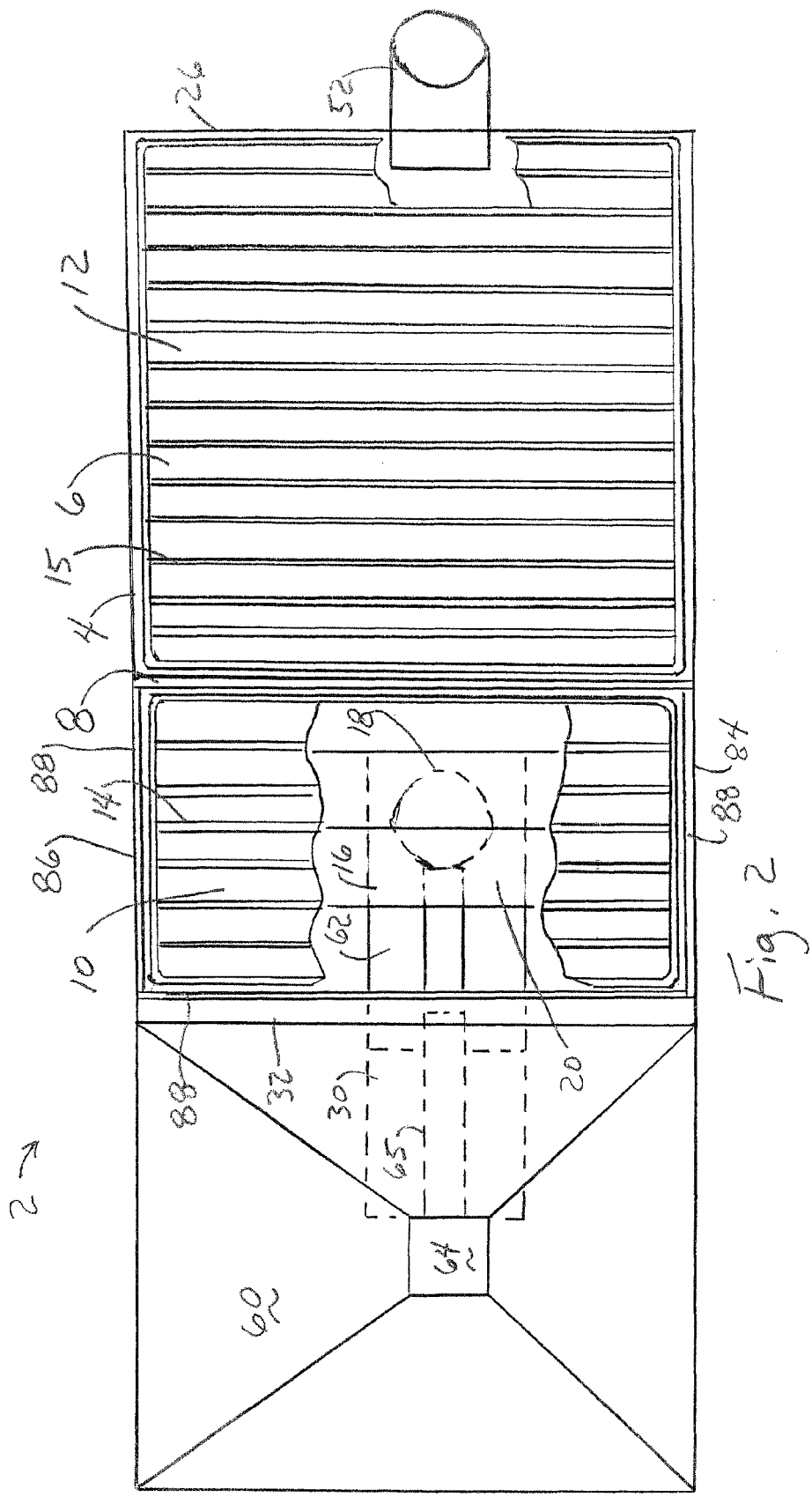
FIG. 2 is a schematic, partially cutaway plan view of the inventive cooking apparatus 2 having the hood thereof removed for purposes of viewing.
Figure 3:
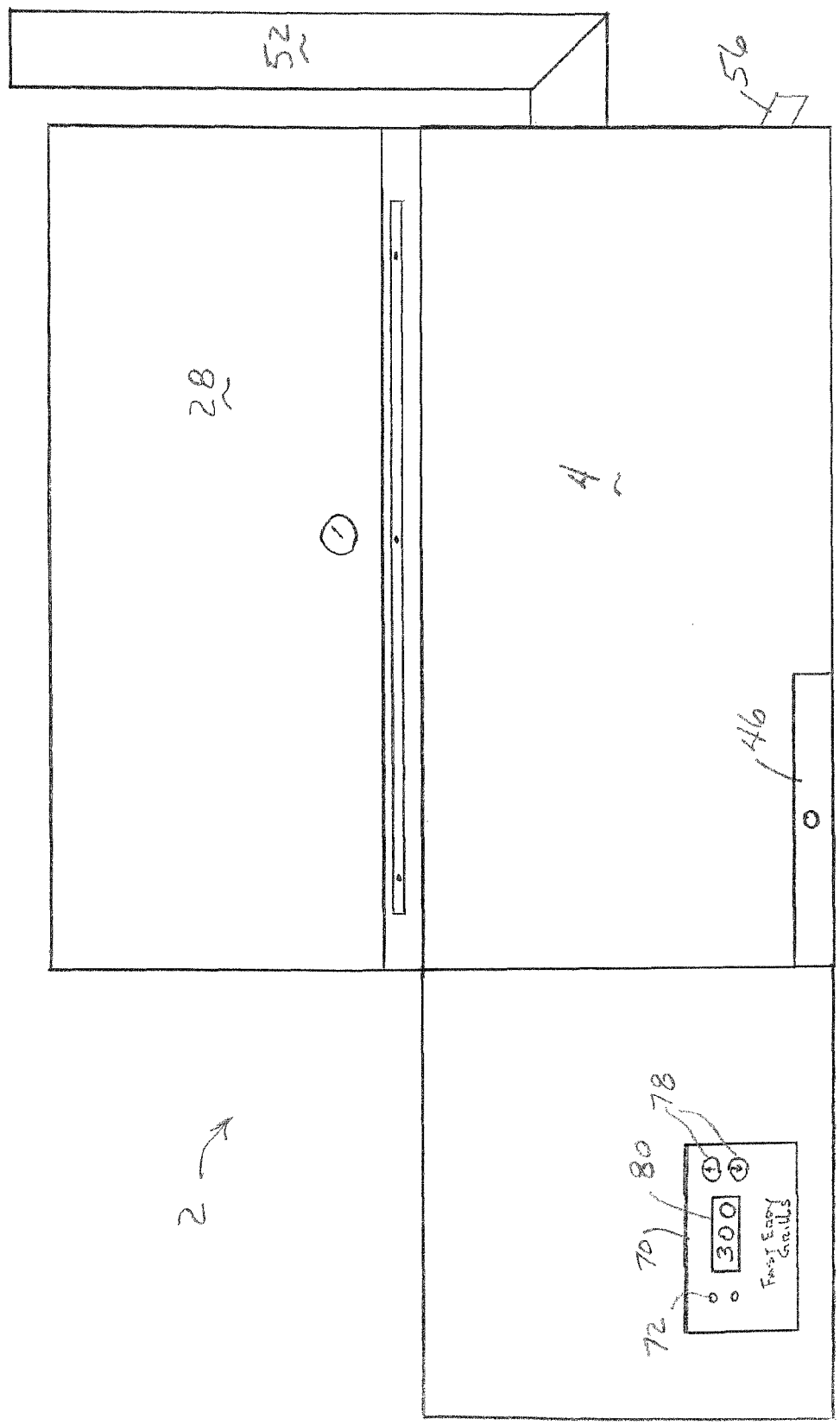
FIG. 3 is an outer elevational side view of the inventive apparatus 2.

An embodiment 2 of the inventive cooking apparatus is illustrated in FIGS. 1-3. The inventive cooking apparatus 2 comprises: a cooker housing 4 having an open top 6; a lateral dividing wall 8 within housing 4 which divides the housing 4 into a direct cooking zone 10 and an indirect cooking zone 12; an open grill or other food holding structure 14 positionable in the upper portion of the direct cooking zone 10; an open grill or other food holding structure 15 positionable in the upper portion of the indirect cooking zone 12; a wood pellet burning system 16 including a burner cup 18 positioned in the direct cooking zone 10 below the food holding structure 14; a heat distributor 20 extending laterally in the direct cooking zone above the burner cup 18 and below the food holding structure 14; a drip drain pan 22 positioned in the indirect cooking zone 12 below the food holding structure 15; a combustion gas outlet 24 for the indirect cooking zone 12 provided through the outer end wall 26 of the housing 4 opposite the divider 8; and a hood 28 pivotably connected to the housing 4 for opening and closing the open top 6 thereof.

The wood pellet burning system 16 used in apparatus 2 preferably comprises: a housing 30 which extends through the end wall 32 of the cooker housing 4 and holds the burner cup 18; a fan 34 held by the burner housing 30 outside of the cooker housing 4 for blowing combustion air into the burner housing 30 and through a plurality of combustion air ports 38 provided through the wall of the burner cup 18; and an igniter 40 extending into the burner cup for igniting the wood pellet fuel. The igniter 40 preferably comprises an air tube 42 having an electrical heating element therein such that air delivered through the tube 42 by the burner system fan 34 is heated to a temperature (typically about 1120° F.) effective for igniting the wood pellets.

The heat distributor 20 located in the direct cooking zone 10 preferably runs parallel to the divider 8 and also preferably has an inverted V-shape. The heat distributor 20 operates to distribute the cooking heat evenly across the direct cooking zone and operates to reduce flare-ups by preventing fat from dripping into the burner cup 18.

In order to more effectively distribute the wood pellet combustion heat laterally across the entire direct cooking zone 10, the heat distributor 20 preferably comprises a solid portion 47 positioned directly above the burner cup 18 and a plurality of slots or other apertures 45 provided in the outer portions of the distributor 20 for combustion gas flow.

The distributor 20 also operates to prevent ash from rising through the direct cooking zone 10 by deflecting the ash into a combination ash and drip pan 44 provided in the bottom of the direct cooking zone 10 beneath the wood pellet burner 16. A slot 46 is provided through the sidewall of the housing 4 for sliding the ash and drip pan 44 out of and into the bottom of the direct cooking zone 10 for emptying and replacement.

The combustion gas outlet 24 for the indirect cooking zone 12 is preferably positioned at an elevation below that of the food holding structure 15 located in the upper portion of the indirect cooking zone 12. Consequently, when the hood 28 is closed, a combustion gas flow path 48 is created in the inventive cooking apparatus 2 such that the combustion gas generated by burning the wood pellet fuel in the burner cup 18 flows upwardly in the direct cooking zone through the grill or other food holding structure 14, then over the upper end 50 of the divider 8 from the direct cooking zone 10 to the indirect cooking zone 12, then downwardly through the grill or other food holding structure 15 provided in the indirect cooking zone 12, and then out of the combustion gas outlet 24 and into an exterior vent 52. The downward flow of the combustion gas through the grill or other food holding structure 15 in the indirect cooking zone 12 provides the desirable top down cooking mode discussed above.

As used herein and in the claims, the term "hood" can refer to any type of cover which provides sufficient interior clearance and space to allow the combustion gas to flow over the divider wall 8 from the direct cooking zone 10 to the indirect cooking zone 12.

The drip drain pan 22 provided below the grill or other food holding structure 15 in the indirect cooking zone 12 preferably extends across substantially the entire cross section of the indirect cooking zone 12 and slopes downwardly from near the upper end of the divider 8 to a drain spout 56 provided through the bottom of the outer end wall 26 of the cooker housing 4. As mentioned above, because of the desirable top down cooking mode provided in the indirect cooking zone 12, any fat or other material from the products being cooked in the indirect cooking zone 12 will merely fall onto the drip drain pan 22 without causing any flaming or flare-ups.

As further illustrated in FIGS. 1 and 2, the inventive cooking apparatus 2 also comprises: a hopper bin 60 located outside of the cooker housing 4 for holding the wood pellet fuel; a feed chute 62 which extends downwardly at an angle through the end wall 32 of the cooker housing 4 to the top of the burner cup 18; and an auger 66 extending from the bottom portion 64 of hopper bin 60 to the external upper end of the feed chute 62 for conveying the wood pellet fuel from the bottom 64 of the hopper bin 60 to the feed chute 62. Once delivered to the top of the feed chute 62, the wood pellet fuel slides down the chute 62 into the burner cup 18.

As also illustrated in FIG. 1, the bottom end 64 of the hopper bin 60 is preferably located at an elevation below that of the top end of the feed chute 62 so that the auger 66 extends upwardly at an angle from the bottom end 64 of the hopper bin 60 to the top of feed chute 62. The upward angle of the auger 66 and its surrounding auger conduit 65 prevent combustion gas from the direct cooking zone 10 from flowing into and through the auger conduit 65 and into the hopper bin 60.

As will be understood by those in the art, the inventive cooking apparatus 2 preferably further comprises a controller 70 which reads the temperature within the cooking apparatus 2 and controls the temperature within the cooking apparatus 2 by regulating the wood pellet feed rate to the burner cup 18. The controller 70 preferably controls the feed rate to the burner cup 18 by regulating the rotational speed for the auger motor 68. Although any desired temperature within the cooker can be monitored and controlled by the controller 70, the controller 70 will preferably control the temperature or average temperature sensed by one or more thermocouples or other temperature sensors (not shown) located within the indirect cooking zone 12.

To operate the inventive cooking apparatus 2, any desired meat, poultry, fish, vegetable, or other food product(s) can be placed on the grill 14 in the direct cooking zone 10 and/or on the grill 15 in the indirect cooking zone 12. The user can then use the off and on button 72 provided on the controller panel to activate the auger 66, burner fan 34, and igniter 40 to thereby deliver the wood pellet fuel to the burner cup 18 and initiate the combustion process. Regardless of whether the cooker hood 28 is open or closed, the radiant heat and combustion gas generated by the combustion process in the burner cup 18 will directly cook food products positioned on the direct cooking zone grill 14.

In order to cook food items in the indirect cooking zone 12, the user will close the hood 28 so that the combustion gas will be caused to follow the combustion gas flow path 48 illustrated in FIG. 1. When flowing along the combustion gas flow path 48, the combustion gas will flow upwardly through the direct cooking zone 10, then over the upper end 50 of the divider 8, and then downwardly through the grill or other food holding structure 15 toward the combustion gas outlet 24 provided through the outer end wall 26 of the housing 4.

The controller 70 will preferably include control settings 78 allowing the user to set the cooking temperature within the indirect cooking zone, typically at 5° F. increments, at generally any temperature in the range of from about 170° F. to about 600° F. or more. Once the desired cooker temperature is set, the controller 70 operates throughout the cooking process to maintain and control the cooking temperature at the desired set point by regulating the speed of the fuel feed auger 66. A visual display 80 of the temperature within the indirect cooking zone 12 is preferably also provided on the face of the controller.

In order to attain high cooking temperatures and consistently maintain the desired cooking temperature within the indirect heating zone 12, the hood 28 of the cooking apparatus 2 will preferably be insulated. As will be understood by those in the art, the hood 28 of the cooking apparatus 2 will preferably be insulated by the installation of a fiberglass insulation mat 82 within the interior thereof. In addition, in order to further ensure the ability to attain high cooking temperatures in both the direct and indirect cooking zones 10 and 12, and also in order to shield the external burner fan 34 and other external components, the housing end wall 32 and the portions of the housing sidewalls 84 and 86 extending from the end wall 32 to the divider 8 preferably include a similar insulation layer 88.

Thus, the present invention is well adapted to carry out the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within the spirit of this invention as defined by the claims.

What is claimed is:

1. An apparatus for cooking using a wood pellet fuel comprising:
   a direct cooking zone for cooking food items placed therein on a first food holding structure;
   an indirect cooking zone for cooking food items placed therein on a second food holding structure;

a divider which separates said direct cooking zone from said indirect cooking zone; and a burner cup for continuously receiving and burning said wood pellet fuel to produce a combustion gas, said burner cup being positioned in said direct cooking zone below said first food holding structure such that said food items placed in said direct cooking zone will be positioned above said burner cup and said apparatus having a combustion gas flow path wherein said combustion gas from said burner cup will flow upwardly in said direct cooking zone, then over an upper end of said divider, and then downwardly onto said food items placed in said indirect cooking zone.

2. The apparatus of claim 1 further comprising a controller wherein, throughout a cooking process in which said food items are cooked in said apparatus, said controller will read a temperature in said indirect cooking zone and will operate to control said temperature in said indirect cooking zone in accordance with a selected cooking temperature set point by regulating a rate of delivery of said wood pellet fuel to said burner cup.

3. The apparatus of claim 1 further comprising:
a housing wherein said direct cooking zone, said first food holding structure, said indirect cooking zone, said second food holding structure, said divider, and said burner cup are located;
a feed chute extending through a wall of said housing and having a lower end positioned for delivering said wood pellet fuel into said burner cup;
a hopper bin for said wood pellet fuel positioned outside of said housing and having a lower end portion; and
an auger positioned outside of said housing for delivering said wood pellet fuel from said lower end portion of said hopper bin to an upper end of said feed chute,
wherein said lower end portion of said hopper bin is located and said auger is oriented in a manner such that said auger is angled upwardly from said lower end portion of said hopper bin to said upper end of said feed chute.

4. The apparatus of claim 1 further comprising a drip drain pan positioned in said indirect cooking zone below said second food holding structure such that said drip drain pan will be located beneath said food items placed in said indirect cooking zone, said drip drain pan having an upper end adjacent said divider and said drip drain pan extending downwardly toward an end wall of said indirect cooking zone opposite said divider.

5. The apparatus of claim 1 further comprising a heat distributor in said direct cooking zone, said heat distributor being positioned above said burner cup, said heat distributor having a solid middle portion positioned over said burner cup, said heat distributor having a first outer portion on one side of said solid middle portion, and said heat distributor having a second outer portion on an opposite side of said solid middle portion, and each of said first and said second outer end portions having a plurality of apertures therethrough.

6. The apparatus of claim 1 further comprising a heat distributor extending laterally in said direct cooking zone, said heat distributor being positioned above said burner cup and said heat distributor having an inverted V cross-sectional shape.

7. The apparatus of claim 1 further comprising:
a housing wherein said direct cooking zone, said first food holding structure, said indirect cooking zone, said second food holding structure, said divider, and said burner cup are located and
a hood positionable on said housing for closing said housing,
said housing including a combustion gas outlet for said indirect cooking zone, said combustion gas outlet being located such that said food items on said second food holding structure will be positioned at a level above said combustion gas outlet,
wherein, when said hood is positioned to close said housing, said combustion gas from said burner cup will flow upwardly in said direct cooking zone, then over said upper end of said divider, then downwardly through said second food holding structure, and then out of said combustion gas outlet.

8. The apparatus of claim 7 further comprising a heat distributor extending laterally in said direct cooking zone, said heat distributor being positioned above said burner and wherein said heat distributor has an inverted V cross-sectional shape.

9. The apparatus of claim 7 wherein said hood is insulated.

10. The apparatus of claim 9 wherein said direct cooking zone comprises:
an end wall of said housing;
a portion of a first side wall of said housing extending from said end wall to said divider; and
a portion of a second side wall of said housing extending from said end wall to said divider,
wherein said end wall, said portion of said first side wall, and said portion of said second side wall are insulated.

11. The apparatus of claim 1 further comprising:
a cooking housing wherein said direct cooking zone, said first food holding structure, said indirect cooking zone, said second food holding structure, said divider, and said burner cup are located;
a burner housing which holds said burner cup in said cooking housing and extends through a wall of said cooking housing; and
a fan positioned outside of said cooking housing for blowing air into said burner housing;
wherein said burner cup comprises a containing wall having airflow openings therethrough, and said burner cup has an open top, said open top being different from said air flow openings through said containing wall, and
said burner housing is configured in a manner effective for delivering said air to said burner cup such that substantially all of said air from said fan will flow through said air flow openings of said containing wall and said combustion gas, including any uncombusted portion of said air, will then flow out of said open top of said burner cup.

12. The apparatus of claim 11 further comprising an igniter tube which extends through one of said air flow openings for delivering a portion of said air into said burner cup and for heating said portion of said air to a temperature effective for igniting said wood pellet fuel.

13. The apparatus of claim 11 wherein, during operation of said apparatus for both direct and indirect cooking, substantially all air received in said cooking housing will be said air which is delivered by said fan through said burner housing.

14. The apparatus of claim 13 wherein, during operation of said apparatus for both direct and indirect cooking, all of said combustion gas from said burner cup, including any remaining excess portion of said air not consumed in burning said wood pellet fuel, will flow out of said cooking housing via an outlet opening provided through a wall of said indirect cooking zone, said outlet opening being located at an elevation below said second food holding structure.

15. An apparatus for cooking using wood pellets comprising:
a direct cooking zone for cooking food items therein on a first food holding structure;

an indirect cooking zone for cooking food items placed therein on a second food holding structure;

a divider which separates said direct cooking zone from said indirect cooking zone;

a burner for burning said wood pellets to produce a combustion gas, said burner being positioned in said direct cooking zone below said first holding structure such that said food items placed in said direct cooking zone will be positioned above said burner; and a heat distributor extending laterally in said direct cooking zone, said heat distributor being positioned above said burner and said heat distributor having an inverted V cross-sectional shape, said apparatus having a combustion gas flow path wherein said combustion gas from said burner will flow upwardly in said direct cooking zone, then over an upper end of said divider, and then downwardly onto said food items placed in said indirect cooking zone.

16. An apparatus for cooking using wood pellets comprising:

a housing;

a direct cooking zone in said housing for cooking food items on a first food holding structure;

an indirect cooking zone in said housing for cooking food items on a second food holding structure;

a divider in said housing which separates said direct cooking zone from said indirect cooking zone;

a burner for burning wood pellets to produce a combustion gas, said burner being positioned in said direct cooking zone such that said food items on said first food holding structure will be positioned above said burner;

a heat distributor extending laterally in said direct cooking zone, said heat distributor being positioned above said burner and said heat distributor having an inverted V cross-sectional shape; and a hood positionable on said housing for closing said housing, said housing including a combustion gas outlet for said indirect cooking zone, said combustion gas outlet being located such that said food items on said second food holding structure will be positioned at a level above said combustion gas outlet, and wherein, when said hood is positioned to close said housing, said combustion gas from said burner will flow upwardly in said direct cooking zone, then over an upper end of said divider, then downwardly through said second food holding structure, and then out of said combustion gas outlet.

* * * * *